United States Patent
Sakai (10) Patent No.: US 6,788,486 B1
(45) Date of Patent: Sep. 7, 2004

(54) TAPE CASSETTE WITH MEMORY DEVICE INCLUDING MEMORY AND ANTENNA FOR WIRELESS COMMUNICATION WITH ANOTHER ANTENNA IN AUDIO/IMAGE RECORDING AND REPRODUCING SYSTEM

(75) Inventor: Akihira Sakai, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,509
(22) PCT Filed: Mar. 30, 2000
(86) PCT No.: PCT/JP00/02028
  § 371 (c)(1),
  (2), (4) Date: Jan. 24, 2002
(87) PCT Pub. No.: WO00/58966
  PCT Pub. Date: Oct. 5, 2000

(30) Foreign Application Priority Data

Mar. 31, 1999 (JP) .......................................... 11-091998

(51) Int. Cl.[7] ................................................ G11B 19/02
(52) U.S. Cl. .......................................................... 360/69
(58) Field of Search ............................................. 360/69

(56) References Cited

U.S. PATENT DOCUMENTS 5,786,955 A    7/1998  Kori et al.
5,907,446 A  * 5/1999  Ishii et al. ................. 360/72.2

FOREIGN PATENT DOCUMENTS

EP    0795868 A2   9/1997
EP    0851421 A2   7/1998
WO    93/04473     3/1993

* cited by examiner

Primary Examiner—David Hudspeth
Assistant Examiner—Mitchell Slavitt
(74) Attorney, Agent, or Firm—Wenderoth, Lind & Ponack, L.L.P.

(57) ABSTRACT

A tape cassette includes a magnetic tape, a cassette housing in which the magnetic tape is housed, and a memory device attached to the housing. The memory device stores features of data recorded in the magnetic tape. Also, the features include image data, audio data, and control data.

4 Claims, 7 Drawing Sheets

| TIME CODE | TAPE RESIDUAL TIME (min) | SUM OF STILL TIME (sec.) | NUMBER OF USE | ERROR RATE | FORMAT | ERROR WARING |
|---|---|---|---|---|---|---|
| 01:00:00:00 | 120 | 100 | 100 | $3.1*10^{-3}$ | 1125/59Hz | HIGH ERROR |
| 01:09:41:23 | 110 | 10 | 10 | $3.4*10^{-3}$ | 1125/59Hz | CONCEAL V |
| 01:20:02:00 | 100 | 10 | 10 | $5.1*10^{-3}$ | 1125/59Hz | CONCEAL V |
| 01:30:13:13 | 90 | 10 | 10 | $1.1*10^{-2}$ | 1125/59Hz | AUDIO MUTE |
| 01:57:54:20 | 62 | 10 | 10 | $9.6*10^{-3}$ | 1125/59Hz | HIGH ERROR |
| 02:00:05:00 | 59 | 10 | 10 | $5.4*10^{-3}$ | 525/P | HIGH ERROR |
| 02:00:16:00 | 59 | 10 | 10 | $3.7*10^{-2}$ | 525/P | AUDIO MUTE |
| 02:30:00:00 | 30 | 10 | 10 | $9.1*10^{-4}$ | 525/P | ——— |

Fig.7

TAPE CASSETTE WITH MEMORY DEVICE INCLUDING MEMORY AND ANTENNA FOR WIRELESS COMMUNICATION WITH ANOTHER ANTENNA IN AUDIO/IMAGE RECORDING AND REPRODUCING SYSTEM

TECHNICAL FIELD OF THE INVENTION

The present invention relates to a tape cassette for use with an audio/image recording and reproducing system. In particular, the present invention relates to a tape cassette with a memory device, for example, a slip-like thinned memory attached to the tape cassette, the memory, device having a memory for data storage and an antenna for wireless communication with another antenna provided in the audio/image recording and reproducing system.

Also, the present invention relates to an audio/image recording and reproducing apparatus for use with a tape cassette having a thinned memory device attached thereto.

BACKGROUND OF THE INVENTION

A great need has existed for tape cassettes that are used repeatedly to deliver certain information, for example, a chime issued at broadcast stations, to indicate a physical deterioration of the tape located in the cassette housing. For this purpose, there has been proposed a tape evaluator for evaluating the deterioration of the tape. Indeed, the tape evaluator allows the deterioration to be evaluated precisely. However, it requires a long time, i.e., several tens of minutes, per cassette. This means that, in order to evaluate all the tape cassettes in an office or company, a considerable amount of time is wasted.

Another practical way has been utilized in which a replayed number for each tape cassette is recorded in a table and, by referring the table, the deterioration of the tape cassette is determined by the replayed number. This allows the deterioration of every cassette to be determined with a reduced time. However, supposing the fact that some tape cassettes record audio/image only in a limited portion, e.g., beginning portion of the tape, the replayed number may not provide a correct deterioration for every portion of the tape cassette.

SUMMARY OF THE INVENTION

An object of the present invention is to provide a tape cassette that allows the deterioration of the tape cassette to be determined at every portion of the tape whenever needed.

Another object of the present invention is to provide a tape cassette that allows the tape cassette to indicate a portion or portions where no audio/image has been recorded and, thereby, results in an efficient forward/backward winding of the tape.

Another object of the present invention is to provide an audio/image recording and reproducing apparatus for use with a tape cassette with a memory device attached thereto.

Accordingly, a tape cassette according to the present invention has a magnetic tape, a cassette housing in which the magnetic tape is housed, and a memory device attached to the housing, the memory device storing features of data recorded in the magnetic tape.

In another aspect of the tape cassette according to the present invention, the features of data recorded in the magnetic tape include image data, audio data, and control data.

In another aspect of the tape cassette according to the present invention, the features of data recorded in the magnetic tape include at least one of a time code for each of frames, residual time of the magnetic tape, time for each of still and stop operations, error rates, recording formats, and messages of warning.

An audio/image recording and reproducing apparatus for use with a tape cassette with a memory device has a reading element which reads information recorded in the memory device of the tape cassette when the tape reproducing apparatus. The apparatus further includes a writing element. When a stop and still operation is performed for the magnetic tape, the writing element calculates a total time for stop and still operations at a portion where the stop and still operation has been made and then memorizes time code and tape residue for a frame of the portion and a total time and the number of the stop and still operations performed at the frame of the portion. Further, when an error has occurred in a portion of the tape during its reproduction, the writing element records time code and tape residue for a frame of the portion and then records error rate, record format, and warning message in the memory device.

In another aspect of the audio/image recording and reproducing apparatus for use with a tape cassette with a memory device according to the present invention, the audio/image recording and reproducing apparatus comprises a controller which memorizes and updates a tape residue of the magnetic tape in the memory device and controls an initial speed for forward or backward winding of the tape depending upon the tape residue in which audio/image can be recorded.

In another aspect of the audio/image recording and reproducing apparatus according to the present invention, the apparatus displays a content stored in the memory device and allows the displayed content to be modified or updated.

According to the present invention, the deterioration of the magnetic tape can precisely be evaluated at every portion of the magnetic tape with a reduced time and without any difficulty. Also, the tape residue can be provided at any time, causing effective forward and backward windings of the tape with a considerably reduced time.

DETAILED DESCRIPTION OF THE PREFERRED EMBODIMENTS

Figure 1:
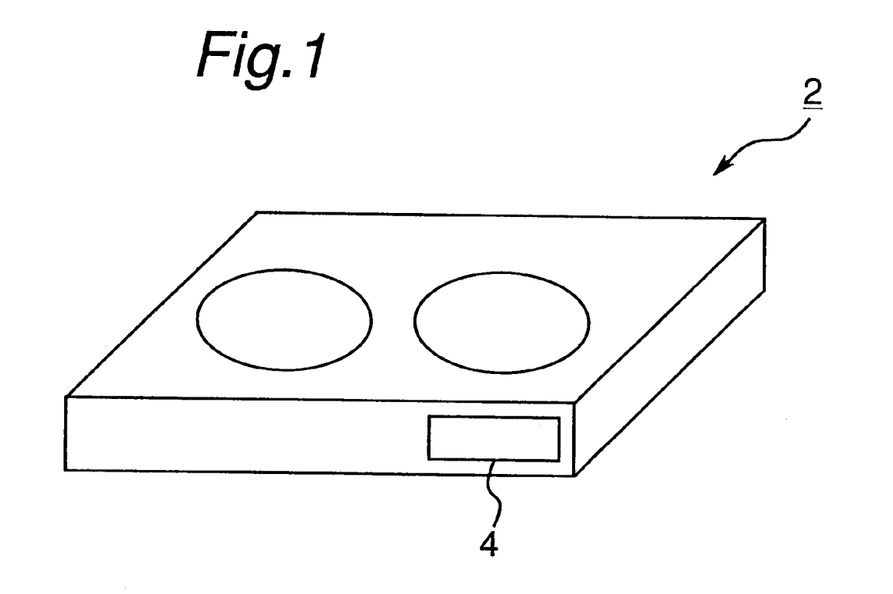
FIG. 1 is a perspective view of a tape cassette having a memory device attached thereto in accordance with the present invention.

FIG. 1 illustrates an appearance of a tape cassette generally indicated by reference numeral 2. The tape cassette 2, which is used with an audio/image recording and reproducing system, includes a plastic casing or housing in the form of box and a tape wounded on a pair of reels (not shown)

rotatably supported in the housing. The housing has a thinned memory device 4 in the form of label, attached on an exterior wall of the housing. The thinned memory device 4 can electromagnetically memorize information or a signal transmitted thereto. A memory device commercially available from SONY Corporation, Japan, under the trade name of "Memory Seal" can preferably be used for the thinned memory device 4.

Figure 2:
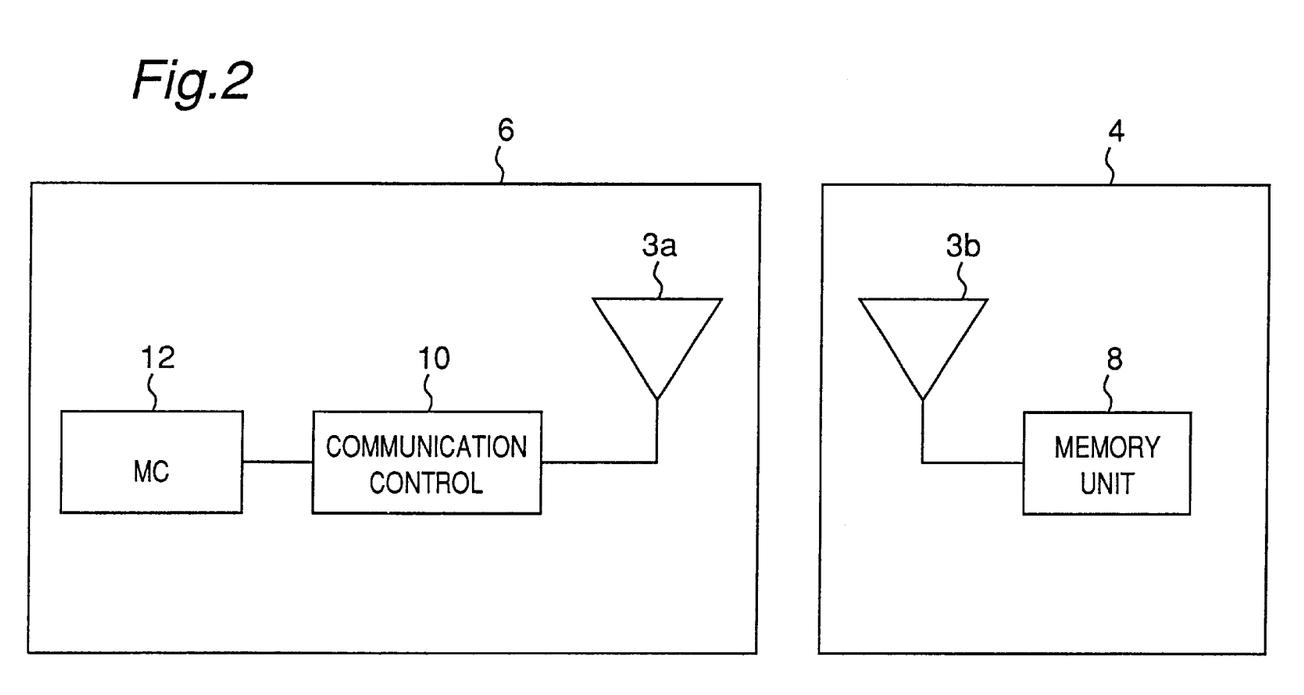
FIG. 2 is a block diagram showing components of the memory device and the corresponding portion of an audio/image recording and reproducing system in accordance with the present invention.

FIG. 2 illustrates a block diagram of the memory device 4 and another block diagram of an interface mounted in the audio/image recording and reproducing system not shown. The memory device 4 includes an antenna 3b for wireless communication with another antenna, and a memory unit 8 for electromagnetically memorizing information or a signal received by the antenna 3b and transmitting memorized information from the antenna 3b. No power supply is incorporated in the memory device 4. Instead, the memory unit 8 employs a non-contact power supply technique. In this non-contact power supply technique, due to the change in an electric field detected by the antenna 3b, the memory unit 8 generates power to energize its electric components necessary for memorizing information transmitted from the antenna 3b and transmitting memorized information from the antenna. 3b. For this purpose, the memory unit 8 includes a memory device, such as nonvolatile memory, capable of keeping data without any power supply, in which the transmitted information are stored.

The interface 6 includes an antenna 3a for the interactive wireless communication with the antenna 3b, a communication control 10, and a microcomputer 12, connected serially. Although not shown, the communication control 10 and microcomputer 12 are electrically communicated with a power supply (not shown) provided inside or outside the audio/image recording and reproducing system. The antennas 3a and 3b are positioned so that, when the tape cassette 2 is mounted into a tape receiving station in the audio/image recording and reproducing system, they oppose and then communicate to each other.

With the above arrangement, when the tape cassette 2 is positioned in the tape receiving station of the system, the antennas 3a and 3b face to each other. In this state, the microcomputer 12 drives the communication control 10 to change the magnetic field around the antennas 3a and 3b, causing the memory unit 8 to energize. Also, the microcomputer 12 commands the communication circuit 10 to transmit information or a signal through the neighboring antennas 3a and 3b into the memory unit 8 where the information is stored. On the other hand, based upon the command from the communication control 10, the memory unit 8 transmits information stored therein through the antennas 3b and 3a, and the communication control 10 into the microcomputer 12.

Figure 3:
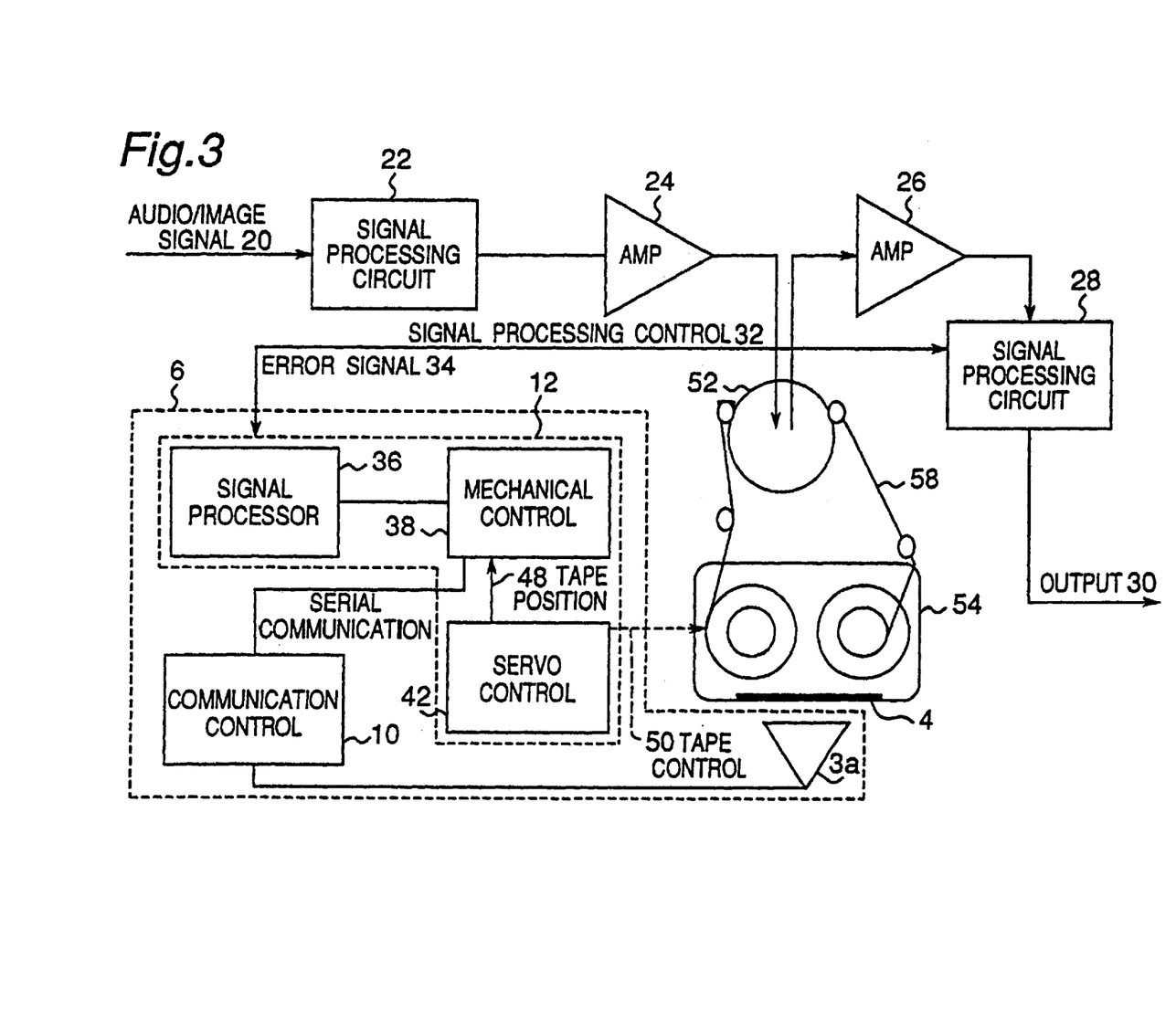
FIG. 3 is a block diagram showing components of the audio/image recording and reproducing system in accordance with the present invention.

FIG. 3 illustrates a block diagram of the audio/image recording and reproducing system and the tape cassette positioned in place in the system. With this system, when recording audio/image on a magnetic tape 58, audio/image signal 20 is transmitted from the audio/image pickup device, not shown, through a signal processing circuit 22. The signal processing circuit 22 processes the input signal 20 into another signal suitable for the recordation onto the magnetic tape 58. The processed signal is transmitted to a recording amplifier 24 where it is amplified. Then, the amplified signal is transmitted to a writing/reading head 52 by which it is recorded onto the magnetic tape 58. On the other hand, when reproducing the audio/image information recorded on the magnetic tape 58, the writing/reading head 52 reads out the recorded information from the magnetic tape 58 and then sends out a signal corresponding to the read-out information. The signal is transmitted to a reproduction amplifier 26 where it is amplified. The amplified signal is then transmitted to a signal processing circuit 28 where it is processed into another signal suitable for reproduction. Further, the processed signal 30 is transmitted to an audio/image output device not shown. Note that the above-described arrangement and its signal processing procedures are well known to the art.

Also, as is known in the art, the signal processing circuit 28 detects any error in the reproduced signal, or the recorded information, for each of the frames. Note that the audio/image signal consists of 30 frames per second. The signal processing circuit 28, once it detects an error, generates an error signal 34 which would be transmitted to a signal processor 36 for processing the error signal 34.

The signal processor 36 performs various operations such as storage, calculation, and other processes for the error signal 34. In addition, the signal processor 36 carries out other operations such as storage, calculation, and other processes of log-file data to be transmitted from the memory unit 8 of the memory device 4, which will be described in detail hereinafter.

The microcomputer 12 includes a mechanical control 38 and servo control 42. The mechanical control 38 controls signals relating to audio/image signal 30, tape control signal 50, and data to be stored in the memory device 4, based upon signals transmitted from the signal processor 36, servo control 42, and communication circuit 10. The servo control 42 controls initial speeds of the forward and backward windings of the magnetic tape based upon information of a residual record time or residual tape portion in which further audio/image can be recorded. Note that the residual information of the tape is transmitted from the mechanical control 38 and then memorized in the memory device 4.

Figure 4:
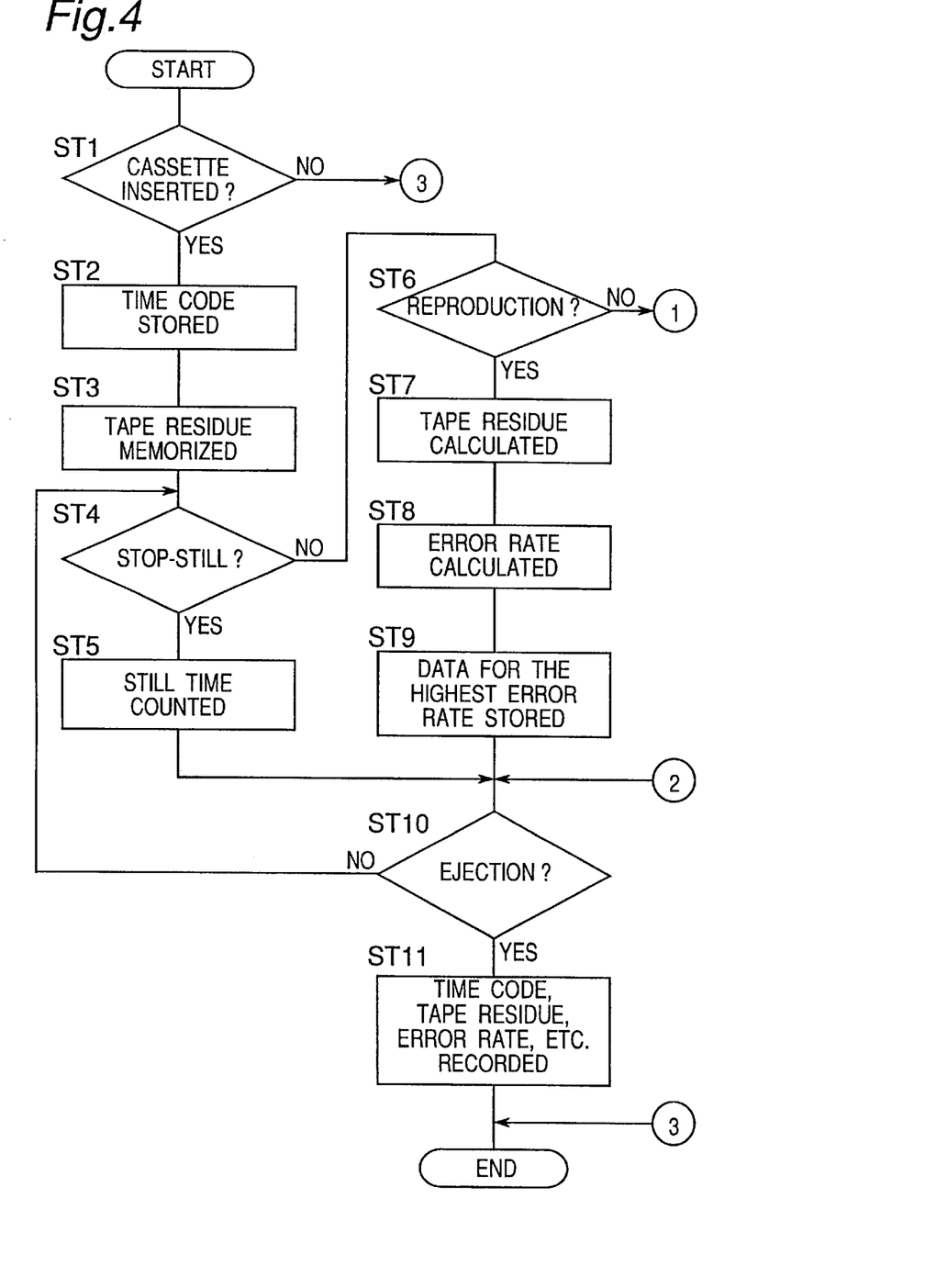
FIGS. 4 and 5 are flowcharts showing a program flow of operations performed in the audio/image recording and reproducing system.
Figure 5:
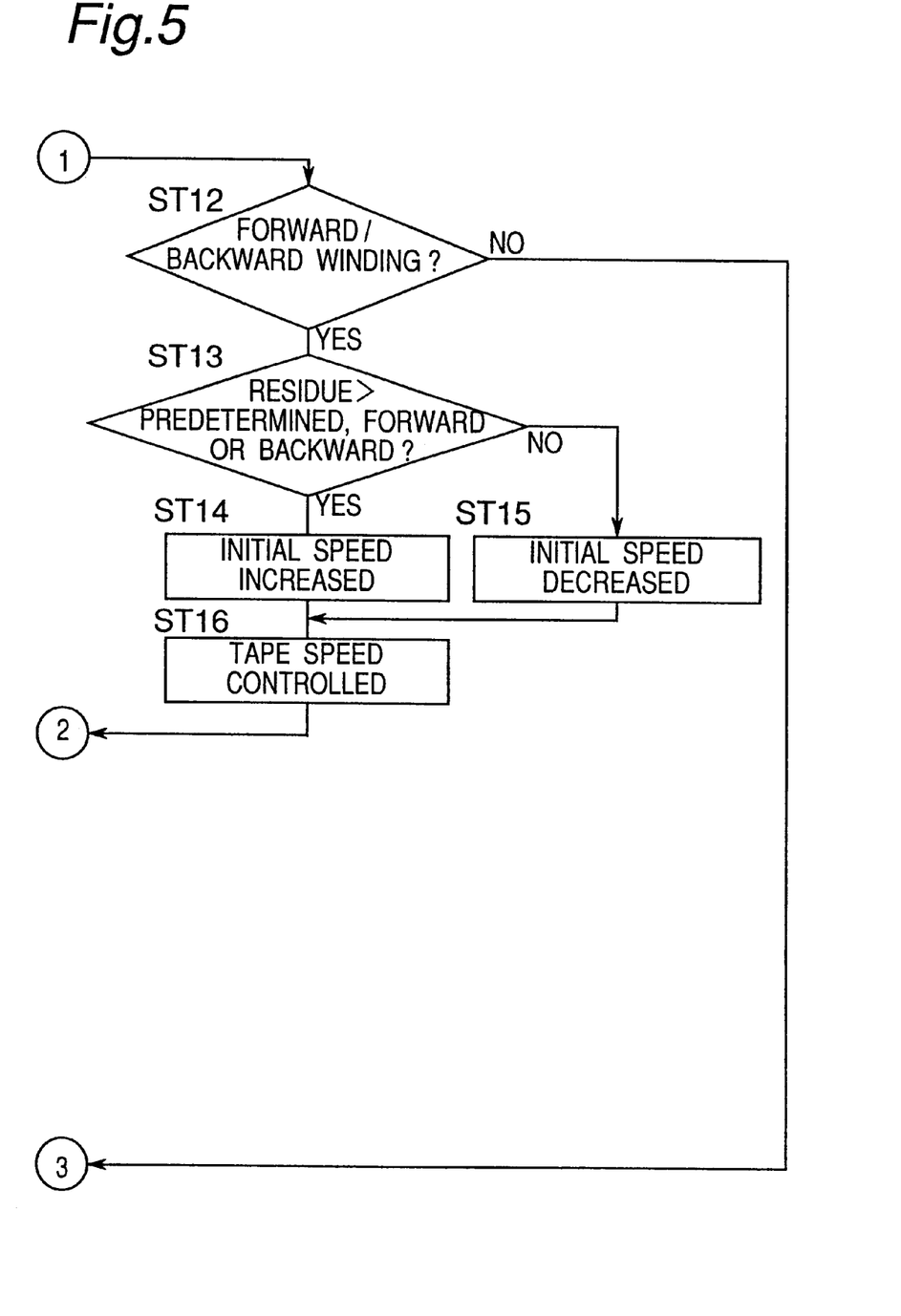

Referring to program flowcharts in FIGS. 4 and 5, operations at the signal processor 36, mechanical control 38 and servo control 42, operations for data input and output at the memory unit 8 in the memory device, and the initial speed control at the forward and backward windings of the tape will be described in detail hereinafter.

In operation, the servo control 42 receives the tape control signal 50 that indicates whether the tape cassette 54 has been inserted in place in the tape receiving station (step 1). When the tape cassette 54 is positioned in the tape receiving station, the servo control 42 receives a time code of the frame in the tape portion, which contacts with the head 52. The time code is then transmitted to the mechanical control 38 where it is memorized (step 2). Although not shown, the mechanical control 38 has a memory, such as random access memory. Also, if the residual record time of the magnetic tape 58 of the inserted tape cassette 54 is recorded in the memory unit 8 of the memory device 4, the mechanical control 38 receives the residual record time from the antenna 3a and communication circuit 10 and then memorizes the same in its memory, such as random access memory (step 3). In addition, log-file data (see FIGS. 6 and 7) in the memory unit 8 is transmitted through the antenna 3a, communication circuit 10, and mechanical control 38 into the signal processor 36 where it is memorized. For this purpose, the signal processor 36 has a memory, such as random access memory, not shown.

Figure 6:
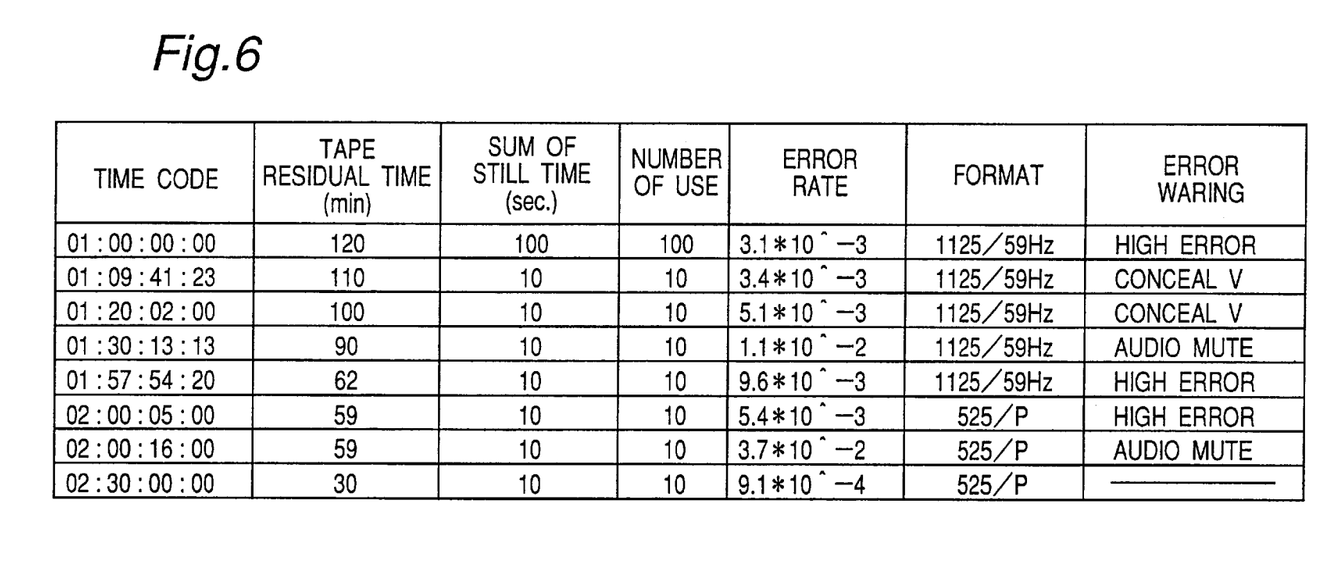
FIG. 6 shows an example of a table of magnetic tape management log-file data.

FIG. 6 illustrates examples of the magnetic tape management log-file data. The log-file data includes various information such as time code, residual record time, sum of still time, the number of times of recordation/reproduction, error rate, record format, and error warning. Therefore, the log-file data provides a useful tool for the quick determination of the deterioration of the magnetic tape. Each content of the information will be described in detail hereinafter.

At each of steps 4, 6, 10, and 12, it is determined by the mechanical control 12 whether any operation that follows the insertion of the tape cassette 54 has been performed. Based upon the determinations, the program flows to a stop and still (i.e., temporal halt or pause), replay, or forward/backward winding process.

In the stop and still process, a still time is counted at step 5. Also, when the tape is restarted, the time code of the frame that has been in contact with the head in this still time is calculated. Further, the total still time and the total still number for the frame are updated. Also, the calculated time code and updated total still time are recorded in the memory of the signal processor 36.

In the reproduction process, the program flows according to steps 7 to 9. The signal processor 36 receives possible error information 34 generated for each of the frames and transmitted from the signal processing circuit 28. Once the error information 34 is received, the signal processor 28 calculates the tape residue in which further audio/image can be recorded from the frame where the error has occurred at step 7 in accordance with the tape position information 48 from the servo control. Further, the signal processor 28 calculates the error rate for the frame where the error has occurred at step 9.

The time code, tape residue, and error rate are temporarily stored in the random access memory of the signal processor 36, together with the format and error warning information of the audio/image signal as it is replayed. The format and error warning information is contained in the error information 34. Examples of the format and error warning of the audio/image signal being reproduced are provided in the log-file data in FIG. 6.

The time code, tape residue, and error rate generated from the error information are data that should be stored as management log for managing the magnetic tape. Note that a storage capacity of the memory unit 8 of the memory device 4 for the magnetic tape 58 is limited. Therefore, in this embodiment, frame data having the highest error rate is selected among log-files in the random access memory of the signal processor 36. Only the selected frame data having the highest error rate is then stored in the random access memory of the signal processor 36 at step 9.

In the forward/backward winding process, the current tape residue stored at step 3 in the random access memory of the mechanical control 38 is compared with the predetermined value. If the current tape residue is greater than the predetermined value and the forward winding is selected by the operator, or if the current tape residue is less than the predetermined value and the backward winding is selected by the operator (step 13), the servo control 42 provides the tape control signal 50 to increase the initial tape speed in the forward or backward operation in the record and reproduction system (step 14).

On the other hand, if the current tape residue is less than the predetermined value and the forward winding is selected by the operator, or if the tape residue is greater than the predetermined value and backward winding is selected by the operator, the servo control 42 provides the tape control signal 50 to decrease the initial tape speed in the forward or backward operation in the record and reproduction system (step 15). As such, the speed control is performed based on the tape residue (step 16).

The above mentioned initial tape speed control at forward or backward winding operation is carried out only when the first operation after the tape cassette insertion is forward or backward operation. Therefore, if the first operation selected after the insertion is the reproduction, the servo control can receive tape position information 48 during the reproduction. Then, after the reproduction, the initial tape speed control at forward and backward operations is performed using the tape position information 48 already received.

In an eject operation in which the tape cassette is ejected from the tape receiving station of the system, before ejecting tape cassette, the content to be stored in the memory unit 8 of the memory device 4 attached to the tape cassette 54 is updated. Among data remaining in the random access memory of the signal processor 36, data of time code, tape residue, error rate, format, and error warning for the highest error rate is stored in the memory unit 8 of the memory device 4 (see FIG. 6). If the time code of the frame at which the stop and still operation is made and its stop and still time are temporally stored in the random access memory of the signal processor 36, those are also used as the management log-file data of the magnetic tape. In addition, the time code, tape residue, total still time, and the total record and replay number are the content to be recorded in the memory unit 8. Moreover, the tape residue when the tape has been ejected is also recorded in the memory unit 8 of the memory device 4.

As described above, the magnetic tape management log-file data stored in the memory unit 8 of the memory device 4 of the tape cassette 54 and then transmitted through the serial communication into the random access memory of the signal processor 36 can be added onto the audio/image output 30 through the signal processor 28, as required. For example, in the display means for displaying the recorded image, the log-file data can be displayed together with or without the reproduction image. This means that, simply by the insertion of the tape cassette 54 into the record and replay system, the operator can understand the tape history and/or the error made to the tape cassette.

Also, the magnetic tape management log-file data added to the audio/image output 30 can be modified or updated by another input means provided in the audio/image recording and reproducing system. Further, the modified or updated log-file data can be used for the update of the data stored in the memory unit 8 of the memory device 4.

Figure 7:
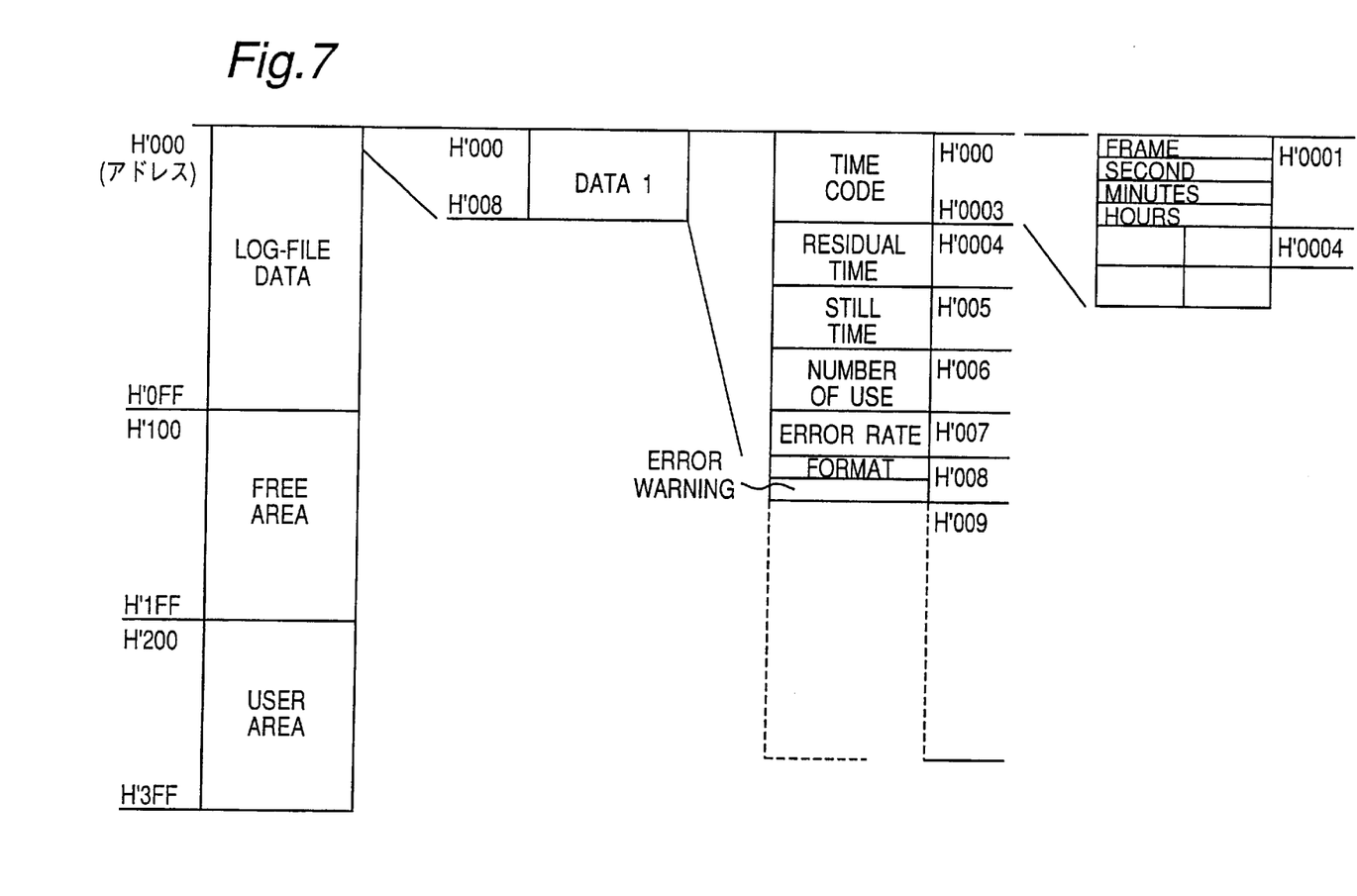
FIG. 7 shows a memory map of the magnetic tape management log-file data.

FIG. 7 illustrates an example of a memory map of the magnetic tape management log-file data. In this embodiment, the storage capacity is 1K bytes in which an area for the management log-file data occupies 256 bytes. Also, a user area in which the user can input data occupies 256 bytes and a free area in which any data can, be stored occupies 512 bytes. If necessary, sizes of the management log-file area, user area, and free area can be modified.

Also, data stored in the user and free areas can be displayed by the audio/image displaying means. The displayed data, e.g., data in the user area and free area, may be modified or updated by the input or modifying means.

What is claimed is:

1. An audio/image recording and reproducing apparatus for use with a tape cassette having magnetic tape and a memory device, said audio/image recording and reproducing apparatus comprising:

a reading element operable to read information recorded in the memory device of the tape cassette when the tape cassette is mounted in said audio/image recording and reproducing apparatus; and a writing element, wherein, when a stop and still operation is performed for the magnetic tape, said writing element calculates a total time for stop and still operations at a portion of the magnetic tape where the stop and still operation has been made and then memorizes a time code and a tape residue for a frame of the portion and a total time and a number of stop and still operations performed at the frame of the portion, and wherein, when an error has occurred in a portion of the magnetic tape during reproduction, said writing element records a time code and a tape residue for a frame of the portion and then records an error rate, a record format, and a warning message in the memory device.

2. An audio/image recording and reproducing apparatus in accordance with claim 1, further comprising a controller operable to memorize and update a tape residue of the magnetic tape in the memory device and control an initial speed for forward or backward winding of the magnetic tape depending upon the tape residue of the magnetic tape in which at least one of audio and an image is recordable.

3. An audio/image recording and reproducing apparatus in accordance with claim 1, wherein said audio/image recording and reproducing apparatus displays content stored in the memory device and allows the displayed content to be modified or updated.

4. An audio/image recording and reproducing apparatus in accordance with claim 2, wherein said audio/image recording and reproducing apparatus displays content stored in the memory device and allows the displayed content to be modified or updated.

* * * * *